Aug. 14, 1928.  H. L. EDDY  1,680,600
WHEEL RIM CONTRACTING AND EXPANDING TOOL
Filed Oct. 7, 1926
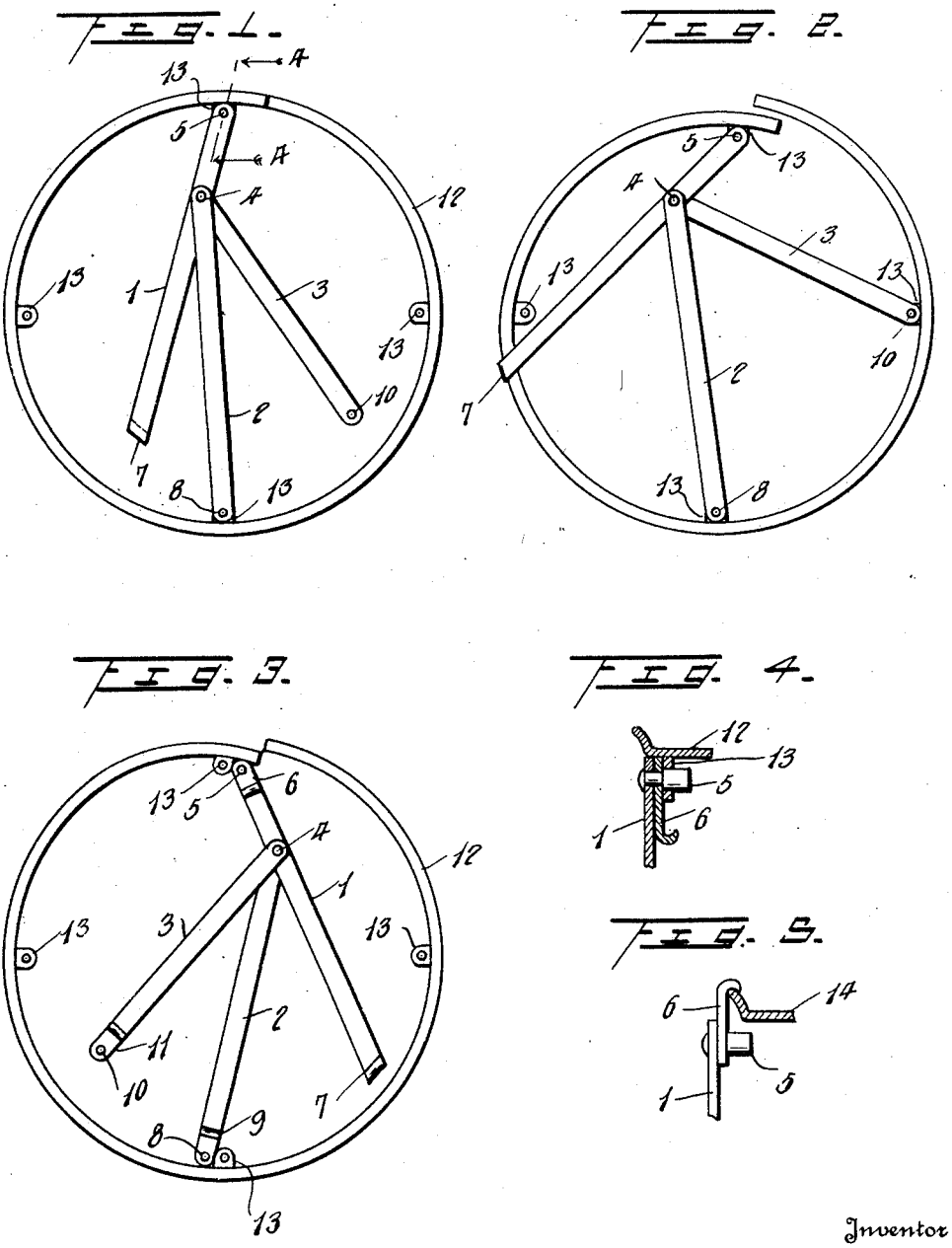

Patented Aug. 14, 1928.

1,680,600

UNITED STATES PATENT OFFICE.

HERBERT L. EDDY, OF HAMILTON, KANSAS.

WHEEL-RIM CONTRACTING AND EXPANDING TOOL.

Application filed October 7, 1926. Serial No. 140,095.

This invention relates to and has for one of its objects to provide a novel, simple and inexpensive tool through the medium of which tire carrying wheel rims of the split type may be easily and quickly contracted to permit the removal of tires therefrom and easily and quickly expanded to secure tires in position thereon.

A further object of the invention is to provide a tool of the character stated which may be used to contract or expand wheel rims of the type provided with attaching lugs and those of the type not equipped with such lugs.

With the foregoing and other objects in view, the nature of which will become apparent as the description preceeds, the invention consists of the novel construction, combination and arrangement of parts hereinafter fully described and claimed, and illustrated in the accompanying drawing, wherein:

Figure 1 is an elevational view illustrating the manner in which the tool is used to break the locked connection between the ends of a wheel rim provided with attaching lugs, Figure 2 is an elevational view illustrating the manner in which the tool is used to contract a wheel rim after the breaking of the lock connection between the ends thereof, Figure 3 is an elevational view illustrating the manner in which the tool is used to expand the wheel rim, Figure 4 is a sectional view taken on the plane indicated by the line 4—4 of Figure 1, and Figure 5 is a sectional view illustrating the manner in which the tool is to be engaged with a wheel rim not provided with attaching lugs when it is desired to effect the contraction of the rim.

Corresponding and like parts are referred to in the following description, and designated in the several views of the accompanying drawing, by similar reference characters.

The tool comprises, as shown in the drawing, a lever 1 and links 2 and 3. The link 2 is slightly longer than the link 3, and these parts are each pivoted at one end to the lever 1 at a point adjacent one end of the latter by means of a bolt or rivet 4. The short arm of the lever 1 is provided at its outer end with an attaching element in the form of a pin 5 and a hook 6, and the long arm of the lever is provided at its outer end with an attaching element in the form of a hook 7. The pin 5 and the bills of the hooks 6 and 7 extend laterally from the lever 1 in a common direction. The pin 5 and hook 7 are fixed rigidly to the lever 1, and the hook 6 is pivoted to the lever by means of the pin 5. The link 2 is provided at its free end with attaching elements in the form of a pin 8 and hook 9, and the link 3 is provided at its free end with attaching elements in the form of a pin 10 and a hook 11. The pins 8 and 10 and the bills of the hooks 9 and 11 extend laterally from the links 2 and 3 in the direction of the extension of the pin 5 and the bill of the hook 6 from the lever 1. The pins 8 and 10 are fixed rigidly to the links 2 and 3, and the hooks 9 and 11 are pivotally secured to these parts by said hooks. The formation of the hooks and the manner in which they are pivotally secured in applied position by means of the pins, are clearly illustrated in Figure 4.

As the hooks 6, 9 and 11 are pivotally mounted, they may be adjusted to position their bills inwardly beyond the pins 5, 8 and 10, as shown in Figure 4, or adjusted to position their bills outwardly beyond the pins, as shown in Figure 5. When the hooks 6, 9 and 11 are in the first of said positions, the tool is adapted for contracting or expanding a wheel rim of the type provided with attaching lugs, and when the hooks are in the second of said positions, the tool is adapted for contracting a wheel rim of the type not provided with attaching lugs. When the hooks 6, 9 and 11 are in the first of said positions they are located inwardly of the outer end of the short arm of the lever 1 and the free links 2 and 3, and when the hooks are in the second of said positions they extend beyond said ends of the lever and links, whereby to prevent the hooks from interfering with the use of the pins and to prevent the pins from interfering with the use of the hooks.

A wheel rim of the type provided with attaching lugs is shown in Figures 1, 2 and 3. This rim is designated by the numeral 12 and the attaching lugs thereof by the numeral 13. When it is desired to contract this rim, the pin 5 of the lever 1 is engaged with the lug located nearest the split of the rim, and the pin 8 of the link 2 is engaged with a diametrically opposed lug, as shown in Figure 1. The lever 1 is then swung to the left so as to brake the locking connection between the ends of the rim. After this has been done, the pin 10 of the link 3 is engaged with a lug located intermediate the lugs engaged by the pins 5 and 8, and thereafter the lever 1 is moved further to the left and the hook 7 thereof engaged with the rim. This movement of the lever 1 contracts the rim, and the engagement of the hook 7 with the rim holds the rim in contracted condition, as shown in Figure 2. With the rim in this condition, a tire, not shown, may be readily removed therefrom or applied thereto. To expand the rim so as to secure the tire in place thereon, the tool is disengaged from the lug and positioned within the rim with the outer ends of the lever 1 and link 2 in contact with the inner side of the rim, as shown in Figure 3, and thereafter the lever is moved to the left until the ends of the rim are locked together. To contract or expand a rim of the type not provided with lugs, such as that shown in Figure 5 and designated 14, the tool is used in the manner described, with the exception that during the contraction of the rim the hooks 6, 9 and 11, are engaged with a flange of the rim as shown in said Figure.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A rim tool comprising a lever, links of different lengths and each connected at one end to the lever near one end of the latter by a common pivot, attaching elements secured to a side of the lever at the ends thereof, and attaching elements secured to the corresponding sides of the links at the free ends thereof.

2. A rim tool comprising a lever, links of different lengths and each connected at one end to the lever adjacent one end of the latter by a common pivot, a hook pivoted to the lever at the outer end of its short arm, a hook fixed to the lever at the outer end of its long arm, and hooks pivoted to the links at the free ends of the latter, and the bills of all the hooks extending laterally from the lever and links in a common direction.

In testimony whereof I affix my signature.

HERBERT L. EDDY.